H. KLECKLER.
HOISTING CONNECTION FOR AIRPLANES.
APPLICATION FILED MAY 4, 1918.

1,351,764.

Patented Sept. 7, 1920.
2 SHEETS—SHEET 1.

Inventor
HENRY KLECKLER.

By Attorney

H. KLECKLER.
HOISTING CONNECTION FOR AIRPLANES.
APPLICATION FILED MAY 4, 1918.
1,351,764.
Patented Sept. 7, 1920.
2 SHEETS—SHEET 2.
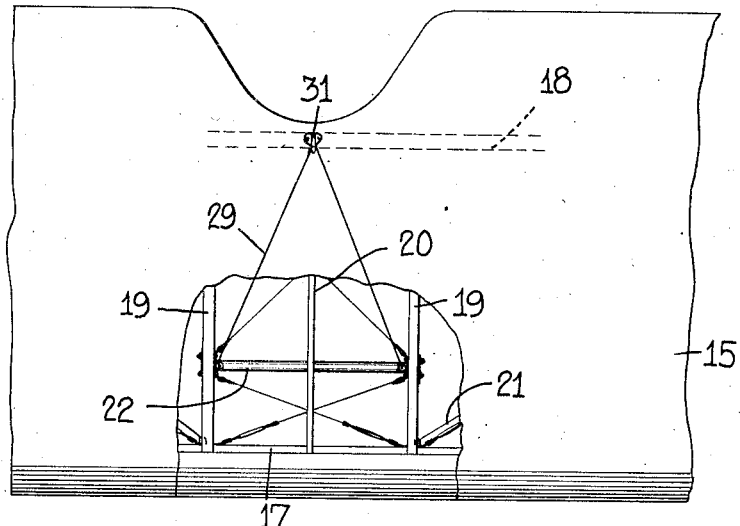
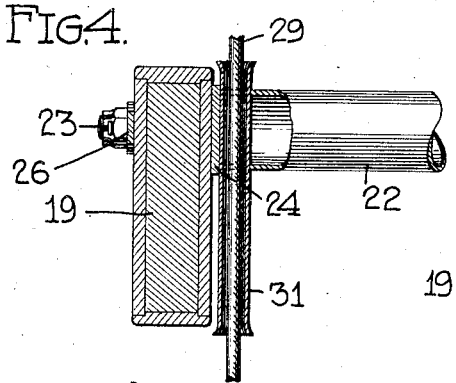
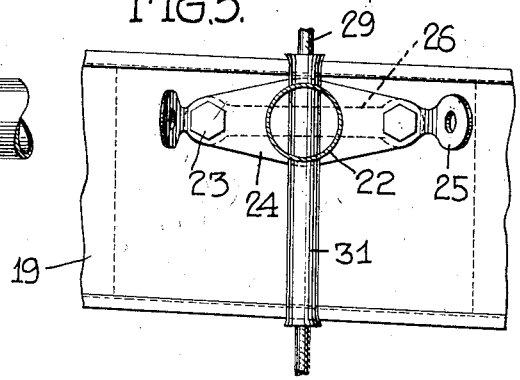
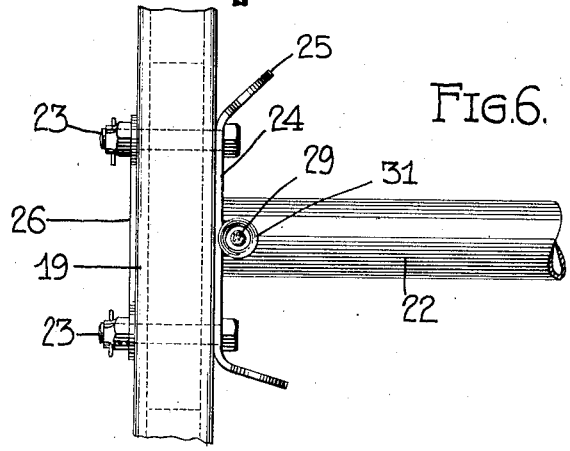
Inventor
HENRY KLECKLER.
By Attorney

UNITED STATES PATENT OFFICE.

HENRY KLECKLER, OF HEMPSTEAD, NEW YORK, ASSIGNOR TO CURTISS AEROPLANE AND MOTOR CORPORATION, A CORPORATION OF NEW YORK.

HOISTING CONNECTION FOR AIRPLANES.

1,351,764.      Specification of Letters Patent.      Patented Sept. 7, 1920.

Application filed May 4, 1918. Serial No. 232,519.

*To all whom it may concern:*

Be it known that I, HENRY KLECKLER, a citizen of the United States, residing at Hempstead, in the county of Nassau and State of New York, have invented certain new and useful Improvements in Hoisting Connections for Airplanes, of which the following is a specification.

My invention relates to hoisting connections for aircraft and more particularly to hoisting connections for airplanes. Although useful for loading and unloading machines before and after transportation and for moving them from one to another section of the factory during their manufacture or assembly, the connection is especially useful in launching and landing hydroaeroplanes and seaplanes respectively from and upon shipboard. It is further useful in hoisting any and all types of airplanes for repair purposes, etc. By incorporating the connection within the airplane structure during its manufacture much annoyance and inconvenience is eliminated incident to its subsequent movement from place to place. Especially is this true when the service or work for which the craft is designed is of a military nature wherein rapid movement of the machine in launching and landing is required.

The characteristic of the invention, as intimated, is the incorporation of the connection in the structural frame-work of the machine. Bearing blocks are provided beneath the fuselage (preferably beneath the lower longerons thereof) and attached thereto by suitable fittings. They constitute anchorages for a hoisting cable having its ends fastened to them by substantially U-shaped straps which extend up and into the fuselage or body. Accordingly a loop in the hoisting cable is provided. The free end of the loop is carried up and through the supporting surface or surfaces next above the fuselage and at the points of penetration the opposed cable lengths are held apart by a compression member built into the upper wing. When not in use the extended or loop-end of the cable lies flat against the top supporting surface where it is held by a snap-hook or other suitable means. When in use the loop end of the cable is released and the hoisting apparatus attached to it. Preferably the connection is located at or near the center of gravity of the machine that its balance may be preserved when hoisted.

Of the drawings, wherein like characters of reference designate like or corresponding parts:—

Fig. 3 is a plan view of the engine section panel of the upper wing (a portion of its covering having been removed);

Fig. 4 is a detail section of one of the upper wing parts showing the fair-lead arrangement and connection between the compression member of the hoisting connection and the compression member of the wing;

Fig. 5 is a side elevation of that portion of the connection illustrated in Fig. 4, and Fig. 6 is a plan view of that portion of the connection illustrated in Fig. 5.

Figure 1:
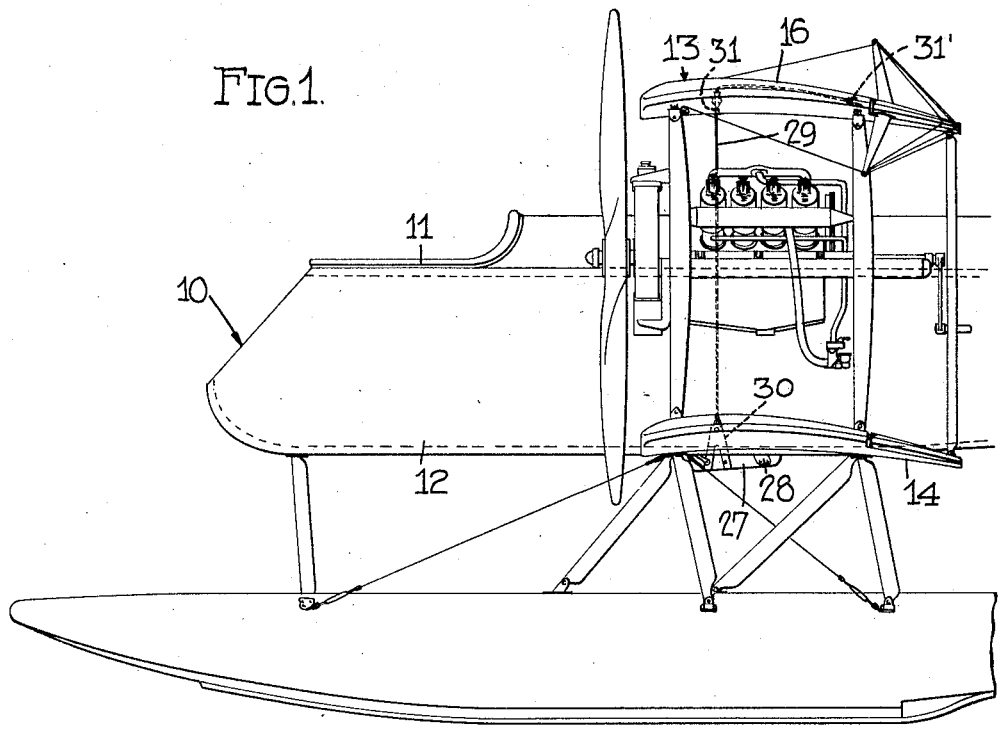
Figure 1 is a side elevation of the forward end of a twin-float hydroaeroplane equipped with the hoisting connection of my invention.

The invention, as stated, is especially useful in connection with military airplanes. For this reason the hoisting connection illustrated is shown as constituting part of a twin-float hydroairplane. The fuselage or body of the airplane is designated as an entirety by the numeral 10 and it includes in its ensemble the usual upper longerons 11 and lower longerons 12. The supporting surfaces 13 and 14 extend intermediately across the fuselage respectively above and in the plane thereof. The upper wing 13 may or may not comprise a number of separable panels. It is shown however as comprising three, an engine section or center panel 15 and opposed upper outer or main panels 16.

The engine section panel 15 is shown as comprising a front wing spar 17, a rear wing spar 18, compression members 19, transverse ribs 20 and internal wiring 21, the latter being cross arranged. Between the center compression members 19 of the panel a transverse compression member 22 is disposed. This compression member is completely inclosed in said panel and fastened to the opposed compression members 19 by bolts 23. It is preferably constructed of metal tubing having fittings 24 brazed or welded to its respective ends. The fittings are provided with ears 25 which serve as anchorages for the internal wing wiring 21. The bolts 23 for the compression member 22 penetrate the fittings.

Directly beneath the compression member 22 longitudinally extending bearing blocks 27 are provided. These blocks parallel the lower longerons 12 of the fuselage and are fitted against the under-surface thereof. They extend longitudinally throughout a substantial portion of the length of the longerons and are held in place by fittings 28.

Figure 2:
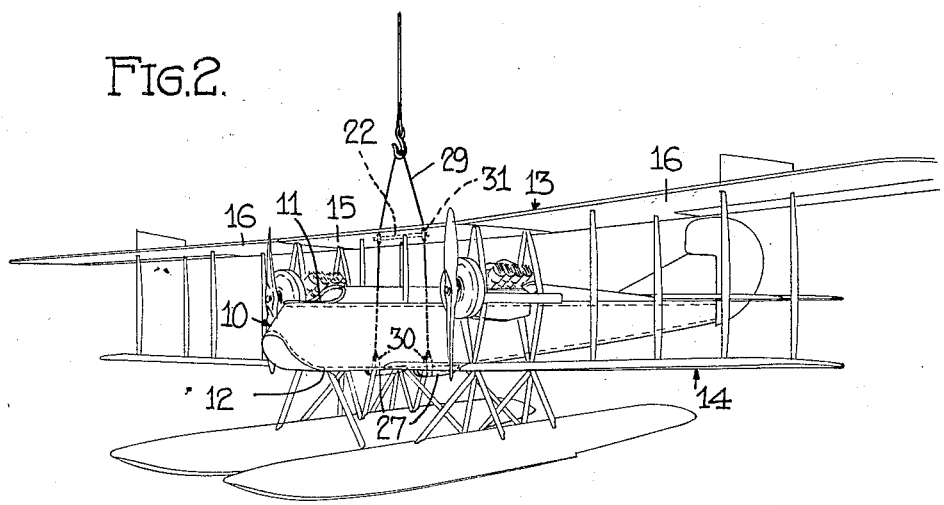
Fig. 2 is a diagrammatic perspective view illustrating the application of the invention and the position of the machine when hoisted.

The hoisting cable (see Figs. 1 and 2) 29 is fastened at its ends to the bearing blocks by substantially U-shaped straps 30 having their bight portions respectively underlying said blocks with their arms or extensions carried up against the sides of the blocks and into the fuselage 10 as indicated in Fig. 1. The cable 29 connects with the straps 30 and continues on up through and beyond the fuselage to the upper wing. At the upper wing the cable lengths extend through fair-leads 31 carried by the compression member 22 which acts as a spacer for the cables. The compression member 22 prevents collapse of the wing at its engine section due to the fact that the cable lengths are held apart. Were the said member 22 not provided the cables would tend to straighten out and as the structural elements of the wing are more or less fragile said elements would bend or break and mutilate the wing. The location of the fair-leads at or near the ends of the compression member 22 is preferred for the reason that such location brings them vertically above the bearing blocks 27. From the fair-leads the cable lengths continue (assuming that they are connected up with the hoisting apparatus) in the form of a loop to which the hoisting apparatus is fastened. When not in use, the loop formed by the opposed cable lengths lies flat upon the top surface of the upper wing (see Fig. 3) where it is held by a snap-hook or other suitable fastening means 31.

The connection is preferably located in such relation to the center of gravity of the machine that its longitudinal balance is preserved while hoisted. The major portion of the connection is completely inclosed in either the fuselage or upper wing so that but little resistance to flight is added. Furthermore, by carrying the hoisting cable lengths down through the fuselage and connecting them with bearing blocks placed beneath the lower longerons the lifting load is effectually distributed although applied at given points. The manner in which the longerons of the fuselage are trussed makes such distribution of the lifting load possible.

Furthermore, the incorporation of a lifting connection in an airplane as a structural element thereof constitutes it an extremely desirable equipment and eliminates much inconvenience and annoyance which now exists when attempting to launch, land, raise or transport an airplane having its center of gravity unknown. It also eliminates the necessity of providing special appliances for preventing mutilation of the fabric covering of both the fuselage and wings.

While I have described my invention in detail in its present preferred embodiment, it will be obvious to those skilled in the art after understanding my invention, that various changes and modifications may be made therein without departing from the spirit or scope thereof, I aim in the appended claims to cover all such modifications and changes.

What is claimed is:

1. The combination, in an airplane, of an airplane wing, a body, and a hoisting connection for the airplane comprising a looped cable having its ends fastened to the body, the cable intermediately of its ends being held apart by an element incorporated in the airplane wing.

2. In a hoisting connection for airplanes, the combination with the supporting surface and the fuselage, of cables fastened to the fuselage by longitudinally extending bearing blocks, said cables being carried through the upper wing and held apart by an element incorporated in the wing structure.

3. The combination in an airplane, of an airplane wing, a body, and a hoisting connection for the airplane comprising a looped cable having its ends extended through the airplane wing for connection with the body, the cable intermediately of its ends being held apart by a compression member hidden within the confines of the wing.

4. A hoisting connection for airplanes including opposed fittings of substantially U-form, bearing blocks mounted beneath the fuselage of the machine to bear against the fittings, and a cable length havings its ends fastened to the fitting, said cable twice penetrating the upper wing of the machine for extension in loop form thereabove.

5. A hoisting connection for airplanes including a cable having its ends let through the upper wing for attachment with the fuselage whereby a loop is provided at the upper cable end, means spacing the cable ends apart in the plane of the upper wing, and fastening means for the cable ends extended into the fuselage.

6. A hoisting connection for airplanes including a cable having a loop formed at one end, the opposite end of the cable being let through the upper wing, means incorporated in the wing structure to prevent its fracture due to displacement of the cable, and means for fastening the ends of the cable to the fuselage.

7. A hoisting connection for airplanes including a cable having its ends fastened to and within the fuselage, a loop formed by thus fastening the cable, said loop being carried through and beyond the upper wing of the machine, and means incorporated in said upper wing for spacing the loop ends apart.

8. The combination, in an airplane, of a fuselage, an airplane wing, and a hoisting connection comprising a cable having its ends extended through the airplane wing and into the fuselage where the ends of the cable are fastened, means connecting with the cable ends for distributing the stresses due to hoisting over a substantial portion of the area of the fuselage, and a compression member incorporated in the airplane wing through which the cable ends pass, the arrangement of the compression member being such that the cable ends are held apart when the machine is hoisted.

In testimony whereof I hereunto affix my signature.

HENRY KLECKLER.